Jan. 12, 1954 J. T. TRUMBLE 2,665,730
INTERLOCKING SHEET METAL AND ATTACHMENT NUT CONSTRUCTION
Filed Feb. 25, 1950
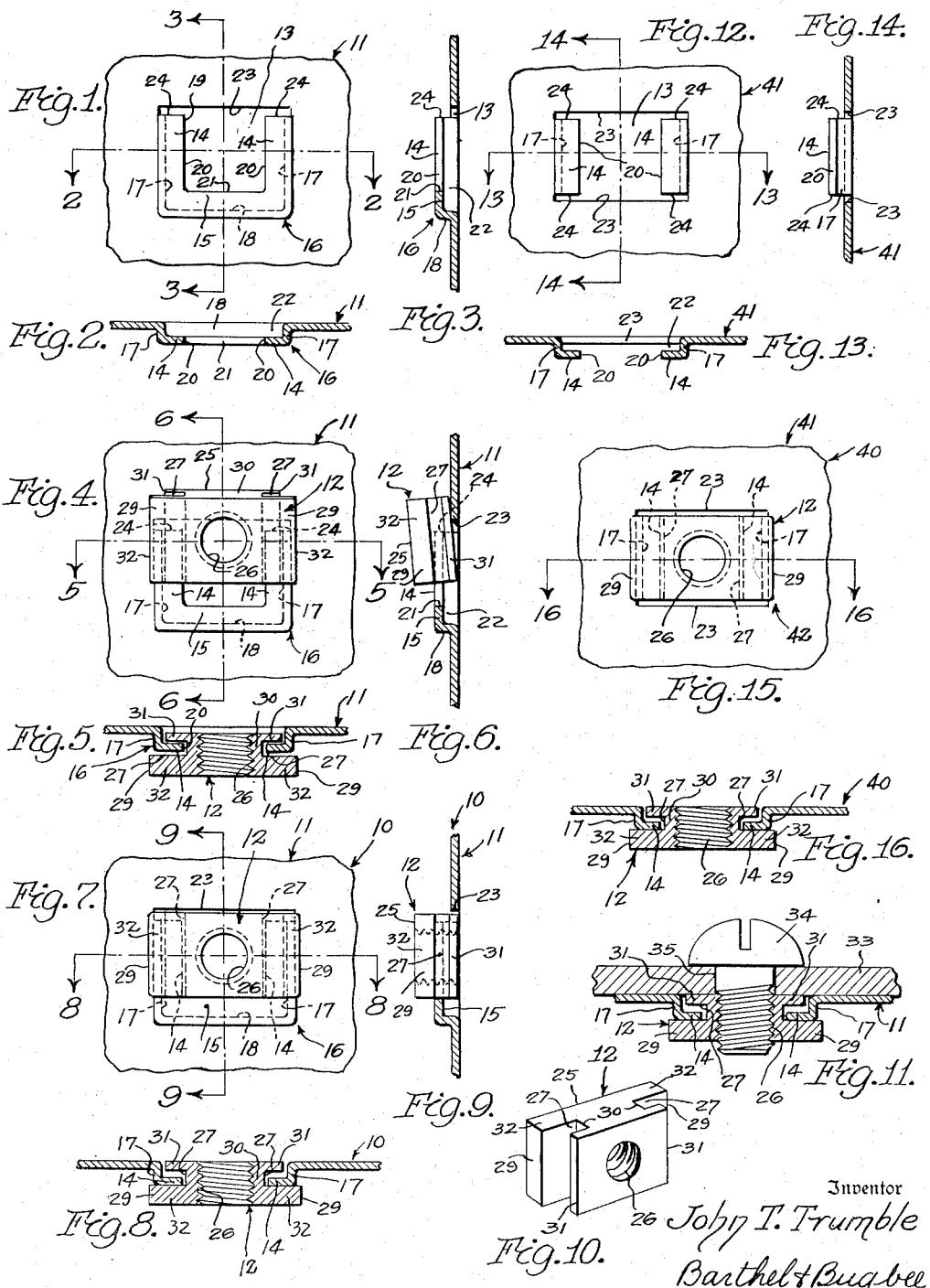
Inventor
John T. Trumble
Barthel & Bugbee
Attorneys Patented Jan. 12, 1954

2,665,730

UNITED STATES PATENT OFFICE 2,665,730

INTERLOCKING SHEET METAL AND ATTACHMENT NUT CONSTRUCTION

John T. Trumble, Detroit, Mich.

Application February 25, 1950, Serial No. 146,205

1 Claim. (Cl. 151—41.7)

This invention relates to fasteners and, in particular, to attachment nuts for connecting bolts or screws to sheet metal.

In industries which are large users of stamped sheet metal parts, such as the automobile body industry, attachment nuts have come into wide use to provide screw threads where the thickness of the sheet metal is itself inadequate for threading. Such nuts which provide these screw threads are frequently welded to the sheet metal or clinched thereto, these being termed weld nuts and clinch nuts respectively. When other parts are to be attached to the sheet metal parts, such as door or other body stampings of an automobile body, screws or bolts are inserted through these parts and beyond them are threaded into the attachment nuts. Such prior weld nuts and clinch nuts, however, add considerably to the time and labor of attaching these parts, and consequently make a considerable addition to the cost of manufacture. The present invention provides an attachment nut which involves no welding, deformation or mutilation of the nut, nor are special tools of any sort required for its installation.

One object of this invention is therefore to provide an interlocking sheet metal and attachment nut structure which permanently attaches the nut without requiring welding or deformation of the nut or special tools for its installation, the nut being grooved and merely slipped into upstruck portions at the opposite sides of an aperture formed in the sheet metal member at the time and in the same operation in which it is stamped out in a stamping press.

Another object is to provide an interlocking sheet metal and attachment nut structure of the foregoing character in which the height of the upstruck portions above the plane of the surrounding sheet metal is made a predetermined dimension in relation to the thickness of the ridge on the nut and the width of the groove so that the nut does not slide loosely into its place on the sheet metal member but must be forced or sprung into place sufficiently to cause it to snap into position and remain there without danger of subsequent dislodgment while the sheet metal part is in service on an automobile body or elsewhere.

Another object is to provide an interlocking sheet metal and attachment nut structure of the foregoing character wherein the upstruck portions consist of flanges extending along and above the opposite sides and optionally one end of a rectangular aperture, and wherein the sides of the nut preferably overhang the side walls of the upstruck flanges, so that these side walls and not the flanges sustain the load imposed by the screw threaded into the nut.

In the drawings:

Figure 1 is a front elevation of a portion of a sheet metal member having an aperture with upstruck opposite sides and one end, ready to receive an attachment nut, according to one form of the invention;

Figure 2 is a horizontal section taken along the line 2—2 in Figure 1;

Figure 3 is a vertical section taken along the line 3—3 in Figure 1;

Figure 4 is a front elevation of the sheet metal member portion of Figure 1, with an attachment nut partially inserted;

Figure 5 is a horizontal section taken along the line 5—5 in Figure 4;

Figure 6 is a vertical section, with the nut in side elevation, taken along the line 6—6 in Figure 4;

Figure 7 is a front elevation similar to Figure 4, but with the attachment nut completely inserted and locked in position;

Figure 8 is a horizontal section taken along the line 8—8 in Figure 7;

Figure 9 is a vertical section, with the nut in side elevation, taken along the line 9—9 in Figure 7;

Figure 10 is a rear perspective view of the attachment but shown in Figures 4 to 8 inclusive;

Figure 11 is a horizontal section through the interlocking sheet metal and attachment nut structure of Figures 1 to 10 inclusive, showing another sheet metal member attached thereto by means of a threaded fastener;

Figure 12 is a front elevation of a portion of a modified sheet metal member having an aperture with upstruck opposite sides only;

Figure 13 is a horizontal section taken along the line 13—13 in Figure 12;

Figure 14 is a vertical section taken along the line 14—14 in Figure 12;

Figure 15 is a front elevation of the sheet metal member portion of Figure 12, with the attachment nut completely inserted and locked in position; and Figure 16 is a horizontal section taken along the line 16—16 in Figure 15.

Referring to the drawings in detail, Figure 7 shows an interlocking sheet metal and attachment nut structure, generally designated 10, according to one form of the invention as including an upstruck apertured sheet metal member, generally designated 11, and an attachment nut, generally designated 12, interlocked therewith, as described below. The sheet metal member 11 (Figures 1, 2 and 3), of which only one portion is shown, may consist, for example, of an automobile body stamping to which another member is to be attached by one or more attachment screws. The sheet metal member 11 shown in Figure 1 for this purpose is provided with an approximately rectangular aperture 13 formed by striking up side flanges 14 having an interconnecting end flange 15, these flanges being spaced above the level of the surrounding sheet metal member 11 to form an upstruck nut receiving portion 16 by side walls 17 and an end wall 18 respectively. The flanges 14 and 15 are separated from one another by a three-sided rectangular cutaway portion 19 having parallel edges 20 and an end edge 21. The foregoing construction thus results in a recess 22 of rectangular outline for receiving the nut 12 and having three of its sides bounded by the side walls 17 and end wall 18, and its fourth side open, with the free aperture edge 23 extending across the aperture 13 in front of the side flange ends 24 and spaced slightly way from them (Figure 1), in order to facilitate insertion of the nut 12.

The attachment nut 12 (Figure 10) has a rectangular body 25 containing a threaded hole 26 and having rectilinear slots 27 cut or otherwise formed in its opposite sides 29. These sides 29 are preferably wider than the aperture 13 so as to overhang the side walls 17 beneath the side flanges 14, whereby the walls 17 sustain the load. The formation of the slots 27 results in the formation of a neck portion 30 from which flanges 31 extend outward in opposite directions and terminating in the unflanged ends 32 of the nut body 25. The width of the lower portion of the nut between the edges of the flanges 31 is preferably less than the width of the main portion of the nut between its opposite sides 29 so as to facilitate insertion of the nut 12. The width of the slots 27 is correlated during design and manufacture with the thickness of the sheet metal member 11, and the heights of its flanges 14 above the adjacent sheet metal member 11 such that the nut 12 may be inserted therein at a relatively small acute angle (Figure 6) and thus not encounter excessive resistance although sufficient resistance to cause it to spring permanently into a locked position.

Prior to the use of the invention, the upstruck flanges 14 and 15 and aperture 13 are preferably formed during the same stamping operation in the stamping press which shapes the member 11 into its desired form, as stated above. To install the grooved nut 12 in the upstruck portion 16 of the sheet metal member 11, one of its unflanged ends 32 is presented to the ends 24 of the flanges 14 and the slots 27 directed to receive the flanges 14 (Figures 4 and 6). The nut 12 is then pushed obliquely into the aperture 13 and recess 22 with its flanges 31 below the sheet metal member flanges 14. The pressure exerted by the operator on the opposite end 32 from that presented to the flanges 14 (Figure 6) causes the flanges and the sheet metal adjacent the free edge 23 of the aperture 13 to spring slightly in an amount sufficient to permit the complete entry of the nut 12. The latter, as soon as it passes over the edge 23, snaps into its permanent position shown in Figures 7 to 9 inclusive, and the temporarily displaced metal of the flanges 14 and sheet metal portion 16 return to their original position.

With the nut 12 completely installed in this manner, it is prevented from becoming accidentally dislodged by the edge 21 of the end flange 15 engaging one end 32 of the nut 12, whereas the other end 32 engages the free edge 23 of the aperture 13. The sheet metal member 11, with its various attachment nuts 12, can thus be assembled in this manner before it is brought into assembly with the other parts to which it is attached, such as, for example, the body of an automobile. On the assembly line, the workman can then easily and quickly attach other members 33 (Figure 11) to the sheet metal member 11 merely by inserting a screw 34 through a previously drilled hole 35 and threads the shank of the screw 34 into the threaded hole 26 in the nut 12. This may be done, for example, by a power-driven magazine screw driver with great rapidity and with low cost of labor. The operator inserts as many screws 34 as there are sheet metal and attachment nut structures 10, the member 33 in this manner being firmly and permanently secured in position in a way which is especially well adapted to modern high speed assembling line manufacturing methods. Since the sides 29 overhang the side walls 17 of the side flanges 14, the side walls 17 and not the flanges 14 sustain the major portion of the load imposed by the screws 34.

The modified interlocking sheet metal and attachment nut structure, generally designated 40, shown in Figures 12 to 16 inclusive is generally similar to the structure 10 shown in Figures 1 to 9 inclusive, and corresponding parts are correspondingly designated. In the modification of Figures 12 to 16 inclusive, the attachment nut 12 is the same as in Figures 1 to 9 inclusive and the side flanges 14 at opposite sides of the aperture 13 also are similarly formed. In the sheet metal member 41 of Figures 12 to 14 inclusive, however, the bridging flange 15 is omitted and the side flanges 14 are the same at both ends 24. Furthermore, the recess 22 is open at its opposite ends 23 instead of being closed at one end by the bridging flange 15 and end wall 18 thereof. The open-ended upstruck portion generally designated 42 has the advantage of permitting the nut 12 to be inserted from opposite directions at some sacrifice in structural strength.

The installation of the nut 12 in the upstruck portion 42 of the sheet metal member 41 is generally similar to the installation previously explained in connection with Figures 1 to 9 inclusive, hence requires no repetition. The attachment of an additional member by means of fasteners is also substantially identical with that described in connection with Figure 11. When the nut 12 has been inserted and snapped into position, as shown in Figures 15 and 16, the flanges 14 and edges 13 which have been slightly sprung out of position during installation, spring back to their original positions and the edges 23 serve as stops for the opposite ends 32 of the nut 12 and prevent it from coming out.

What I claim is:

In an interlocking fastener, a sheet metal member having a rectangular opening provided with upstruck side flanges formed with inturned guide projections, a bridge flange upstruck from said opening connecting the side flanges at one end thereof, said bridge flange being provided with an inturned guide projection connecting said first mentioned guide projections, the opposite ends of the upstruck side flanges and inturned guide projections terminating a slight distance from the edge of said rectangular opening to provide a restricted entrance slot beneath the end of each inturned guide projection and the edge of said opening, and a threaded fastener conforming in shape to said rectangular opening having inwardly directed slots along the full length of a pair of opposite side edges thereof for receiving said guide projections, said slots being cut to form inner and outer sets of opposed flanges, the inwardly directed slots being of a thickness slightly greater than the thickness of said inturned guide projections and the inner flanges of said fastener being slightly thicker than the distance between the internal guide projections and said sheet metal member, so that the fastener can be seated by forcing the inner flanges through said entrance slots which causes the end portions of the guide projections to be yieldingly moved away from said sheet metal member until the threaded member is fully seated and locked in position when the ends of the inturned guide projections have returned to their normal restricting position.

JOHN T. TRUMBLE.

References Cited in the file of this patent

UNITED STATES PATENTS

| Number | Name | Date |
| --- | --- | --- |
| 1,062,635 | Clements | May 27, 1913 |
| 1,579,875 | Lundberg | Apr. 6, 1926 |
| 1,872,385 | Andren | Aug. 16, 1932 |
| 2,029,089 | Weiranch | Jan. 28, 1936 |
| 2,477,429 | Swanstrom et al. | July 26, 1949 |